C. W. DWELLE.
LEVER LOCKING DEVICE.
APPLICATION FILED OCT. 21, 1919.
1,377,413.
Patented May 10, 1921.
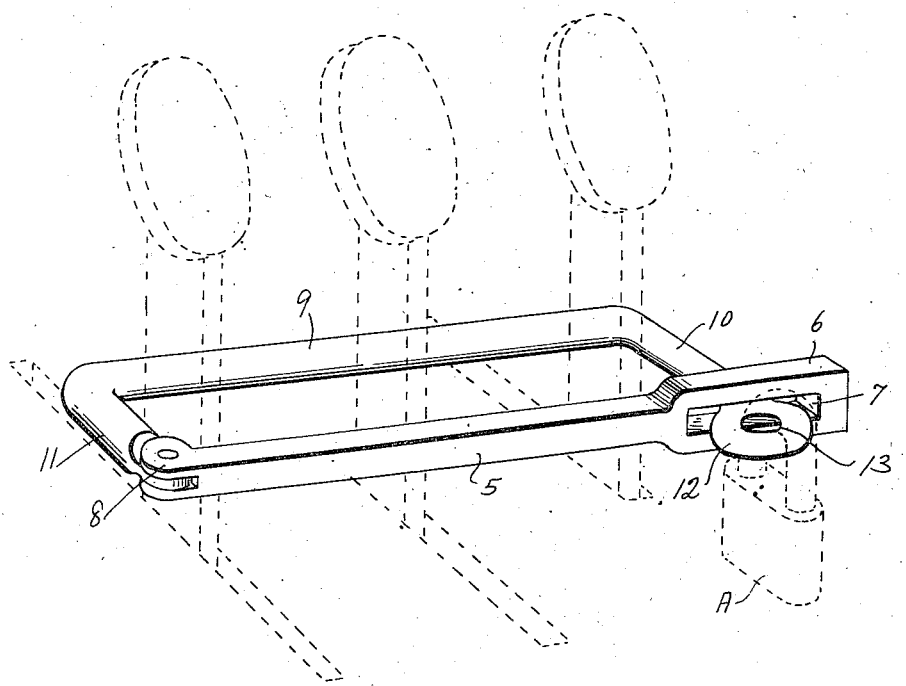
Inventor
C. W. Dwelle
By Watson E. Coleman
Attorney

UNITED STATES PATENT OFFICE.

CLARENCE WILBERT DWELLE, OF SANDUSKY, OHIO.

LEVER-LOCKING DEVICE.

1,377,413.  Specification of Letters Patent.  Patented May 10, 1921.

Application filed October 21, 1919. Serial No. 332,238.

*To all whom it may concern:*

Be it known that I, CLARENCE WILBERT DWELLE, a citizen of the United States, residing at Sandusky, in the county of Erie and State of Ohio, have invented certain new and useful Improvements in Lever-Locking Devices, of which the following is a specification, reference being had to the accompanying drawings.

This invention relates to lever locking devices, and has for its object to provide a device of this character particularly adapted for use in connection with the levers or pedals comprised in the control for motor vehicles to lock the levers and like controlling means to prevent theft of the vehicle.

Another object is to provide a device of this character that cannot be operated or forced open by an unauthorized person.

Another object of the invention is to provide a device of this character that can be easily applied to the controlling means without requiring the driver to leave his seat.

With the above and other objects in view the invention consists in the improved combination and arrangement of parts to be hereinafter more particularly described, fully claimed and illustrated in the accompanying drawings, wherein is illustrated a view in perspective of a lever locking device constructed in accordance with an embodiment of my invention.

Referring to the figure, 3 indicates a hasp arm having in its end 6 an opening 7. The end 8 of the arm is furcated and is arranged to pivotally support a U-shaped locking member 9. The locking member includes arms 10 and 11, the arm 11 being pivoted to the end 8 of the hasp arm. The arm 10 has its end 12 enlarged and provided with an opening 13 intended to receive a lock A to secure the member 9 to the hasp arm.

This form of locking device is particularly adapted for use in connection with an automobile control embodying a brake pedal a reverse pedal and a speed changing or clutch pedal wherein the same are substantially transversely alined when the brake pedal is at substantially its limit of movement when in inoperative position, the reverse pedal at substantially the limit of its movement when in operative position, and the speed changing or clutch pedal in neutral position. My improved device is applied in working position when the pedals or levers are in this particular arrangement and, when applied, the longitudinal portion of the member 9 substantially contacts with the front edges of said pedals or levers while the hasp arm 5 substantially contacts or engages the opposite sides or edges of the pedals. When the member 9 and the hasp arm 5 are held against relative movement by the lock A or its equivalent, my improved device effectually holds the speed changing or clutch lever from being moved forwardly as a result of the coaction of the applied device with the reverse pedal or lever and the brake pedal or lever, resulting in the reverse and brake pedals also being held against movement. Should the speed changing or clutch pedal or lever move rearwardly to operating position, any possible slip of the applied device around the brake pedal or lever will result in the reverse pedal or lever being moved into an inoperative position. In view of these conditions, it will be at once evident with my improved device in applied position, the possibility of manipulation of the automobile control by an unauthorized person is substantially eliminated.

From the foregoing, it will be readily seen that this invention provides a novel locking device not only for automobiles of various makes, but for all forms of machinery where it is desired to lock the controlling means, and in view of its construction, can be easily applied.

What is claimed is:

In combination with an automobile control embodying a brake pedal, a reverse pedal, and a speed changing pedal wherein the same are substantially transversely alined when the brake pedal is in inoperative position, the reverse pedal in operative position and the speed changing pedal in neutral position, an elongated rigid member substantially contacting with the front edges of said pedals when in such position, the extremities of such rigid member being continued by lateral extensions of a length to terminate beyond the rear edges of said pedals, a rigid straight member pivotally engaged at one end portion with the free end portion of one of the angular extensions, the opposite end portion of the second rigid member and the free end portion of the second angular extension being provided with coacting means whereby said second rigid straight member may be locked in position to substantially contact with the rear edges of the pedals.

In testimony whereof I hereunto affix my signature.

CLARENCE WILBERT DWELLE.

Witnesses:
MARGARET NOLAN,
JAMES M. FRENCH.